(No Model.) 2 Sheets—Sheet 1.
M. P. BROWN.
SPIDER FRAME FIRE ESCAPE.
No. 516,517. Patented Mar. 13, 1894.
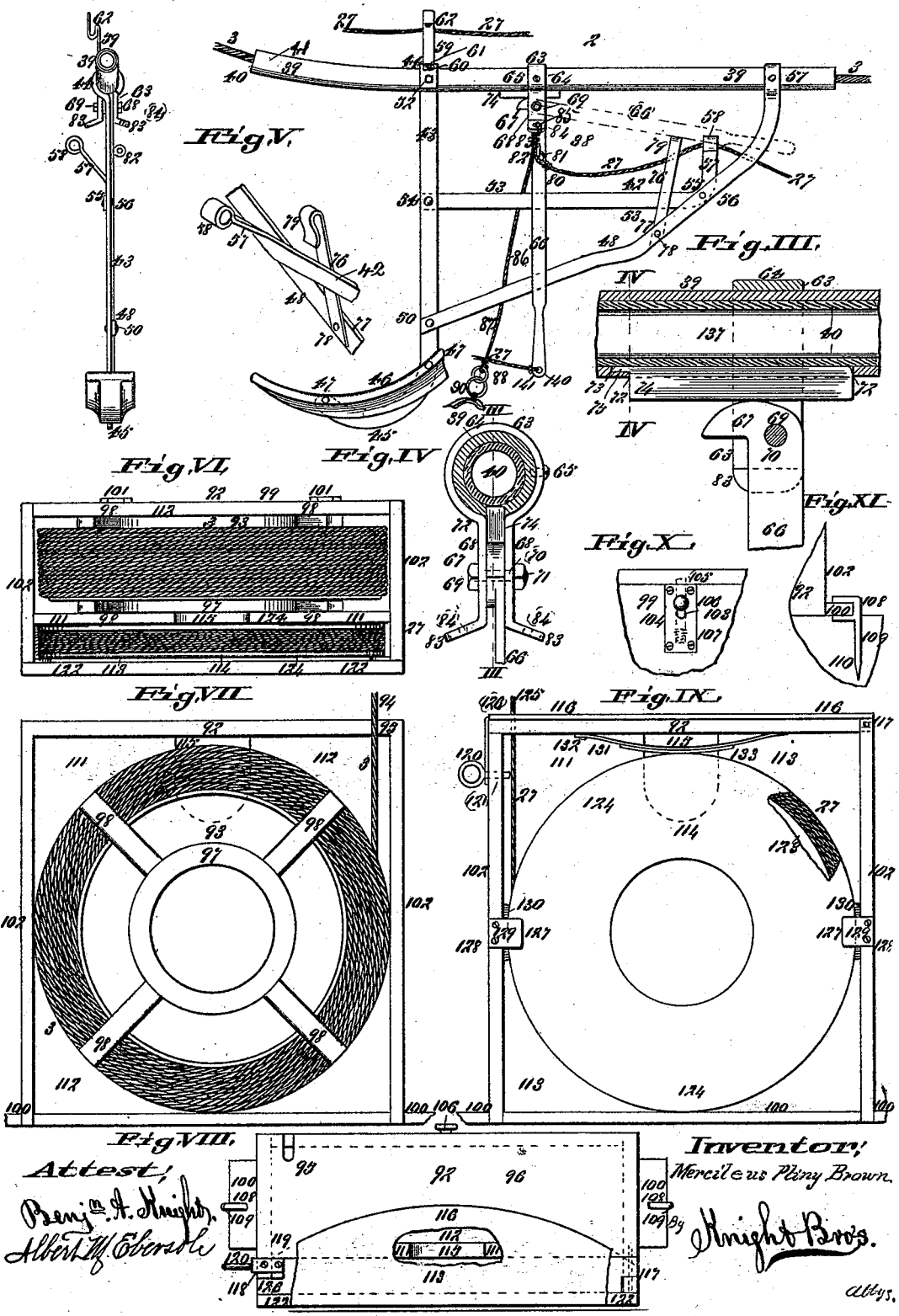
Attest:
Benj. A. Knight
Albert W. Ebersole
Inventor:
Mercileus Pliny Brown
by Knight Bros.
Attys.
THE NATIONAL LITHOGRAPHING COMPANY,
WASHINGTON, D. C.

(No Model.) 2 Sheets—Sheet 2.
M. P. BROWN.
SPIDER FRAME FIRE ESCAPE.
No. 516,517. Patented Mar. 13, 1894.
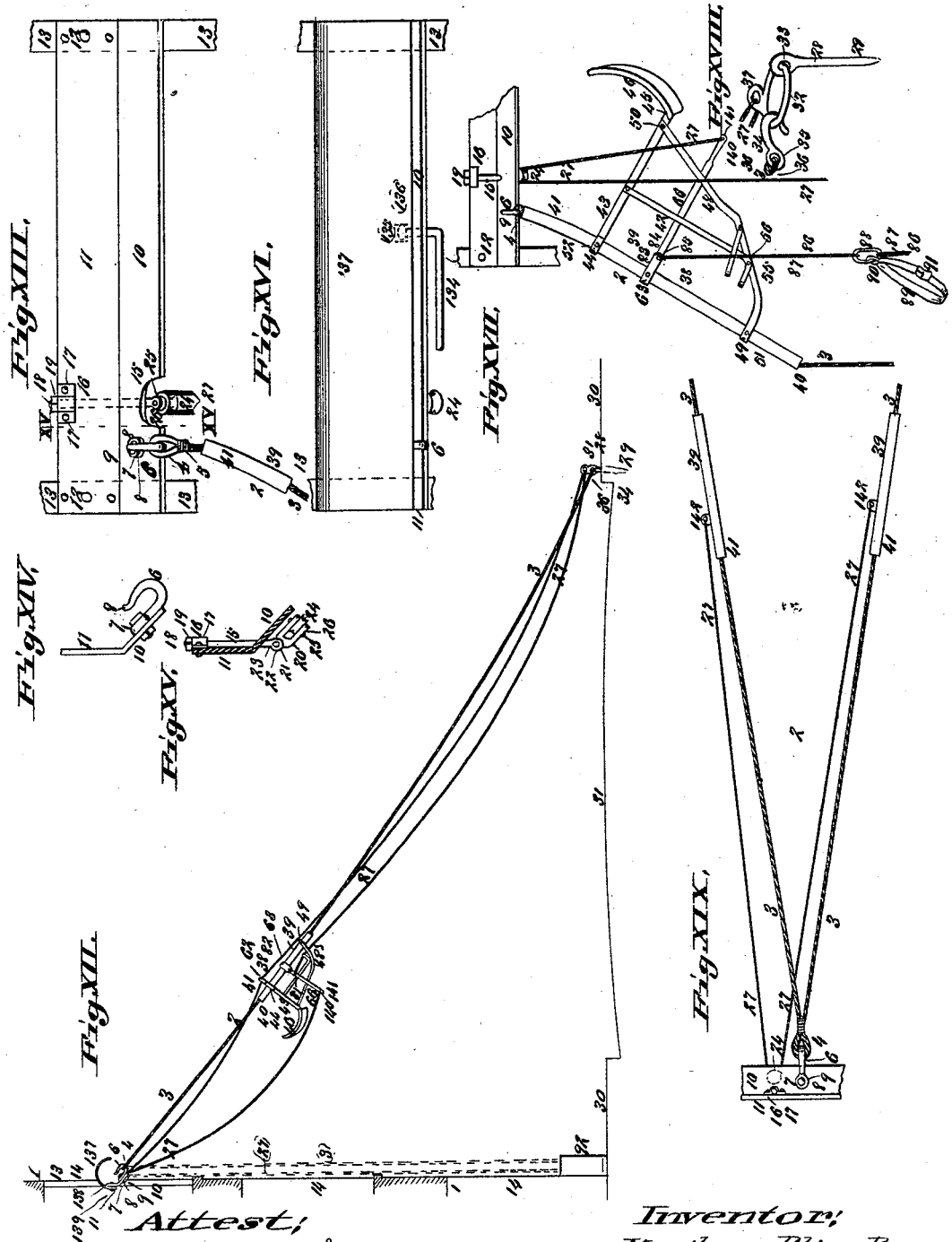
Attest:
Benj. A. Knight.
Albert M. Ebersole
Inventor:
Marcileus Pliny Brown.
By Knight Bros.
attys.

UNITED STATES PATENT OFFICE.

MERCILEUS PLINY BROWN, OF JONESBOROUGH, ARKANSAS.

SPIDER-FRAME FIRE-ESCAPE.

SPECIFICATION forming part of Letters Patent No. 516,517, dated March 13, 1894.

Application filed May 5, 1893. Serial No. 473,057. (No model.)

*To all whom it may concern:*

Be it known that I, MERCILEUS PLINY BROWN, of Jonesborough, in the county of Craighead and State of Arkansas, have invented a certain new and useful Improvement in Fire-Escape Machines, of which the following is a full, clear, and exact description, reference being had to the accompanying drawings, forming part of this specification.

This invention relates to a cable system securely attachable to and housed in safe storage to buildings above, and at times of use secured by moorage in the street below, and on which cable rides one or more passenger carrier spider frames in combination with which a friction lever clamp pressure brake, under the control of the escaping passengers or others aiding them, controls the speed of the descent or stops the same, and the invention consists in features of novelty hereinafter fully described and pointed out in the claims.

Figure I is a side view of the pendent spider frame, with its carrier-tube mounted on the cable on which it runs, and shows the eccentric clamp pressure block lever and the actuating tackle rope. Fig. II is a rear view of said spider frame, pendent from its carrier tube. Fig. III is an enlarged, vertical, detail section, taken on line III—III, Fig. IV, and shows the carrier tube that when operated is mounted on the cable, the attachment strap hanger, that carries the eccentric clamp lever mounted on said tube, the said lever with its eccentric head, and the clamp tension block that said lever operates to slow up or stay the travel of the carrier spider frame. Fig. IV is an enlarged, vertical, detail section taken on line IV—IV, Fig. III, and shows the carrier tube, the friction anti-wear lining within said tube, the strap hanger mounted on said tube, the pivoted eccentric lever, and the clamp block that said eccentric works. Fig. V is an enlarged, detail of the spider frame, and shows one of the tackle guide-loops and the upwardly projecting combined spring guide hook and lever rest, its last function being exercised when said lever is elevated and at rest off duty. Fig. VI is a top view of the reel chest in which the major reel on which the cable is wound, and the minor reel on which the actuating tackle is wound are housed. Fig. VII is a front side view of the reel chest, the cable reel housed therein, and the cable that hangs pendent from the side of the building passing down into said chest and wound on said reel. Fig. VIII is a top view of the reel chest with its closed cover, and shows the hinged supplemental cover of the back of said reel chest, which when elevated and thrown back gives access to the minor reel that carries the actuating tackle, rope to allow the lifting of said reel from the chest when said tackle is to be attached in operative position. Fig. IX is a rear view of the reel chest and shows the minor reel, with part broken away, to show the actuating tackle rope wound thereon, the said tackle rope that hangs pendent from the side of the building passing through the top of said chest to said reel, and it also shows the rubber gaskets at each side of the reel that steady it in its chamber in the chest, and the spring loop stay with its rubber facing that elastically holds it at top. Fig. X is a detail of the elevating shutter in the front of the reel-chest and shows the spring catch that locks it when closed. Fig. XI is a detail and shows the reel chest with its projecting base held by a turning clamp hook that is driven into the ground or bedded in the pavement at the side of the house and turned part around to hold said chest. Fig. XII is a side view, and shows the cable and actuating tackle secured to a building above, and to the pavement in the street below at the time of a fire, with the spider frame mounted on said cable, under the control of the eccentric lever, and of said actuating tackle. Fig. XIII is a front view of the steel flanged bar from which the escape cable and actuating tackle hang pendent, said bar being secured to the window-jambs. Fig. XIV is an end view of said flanged bar and shows the hook that supports the upper end of the cable. Fig. XV is a vertical section, taken on line XV—XV, Fig. XIII, and shows said flanged bar, a pulley hanged bolt secured thereto, and the pulley that carries the actuating tackle rope pivoted thereto. Fig. XVI is a front view, and shows the flanged bar mostly obscured by a surmounting coping that protects the same and the cable attachment from the weather, and it also shows a pendent angle turn spindle secured to the flange of said bar, on which spindle the overplus of the actuating tackle rope is wound, when the system of duplex counterpoise spiders are seated on the duplex cable and previous to use are laid away at rest. Fig. XVII is a side view of the spider carrier frame when at rest, hanging from its attachment bar, and shows a pendent rope suspended from near the pivot end of the eccentric lever, with one of its attachment links and buckle straps, the said strap arranged to be secured around the body of a person escaping from the fire. A succession of lengths of said rope, links, and straps, are arranged in line to afford means of escape from windows in succeeding stories beneath. Fig. XVIII is a perspective view of one of the duplex ring bolts, to be bedded in the pavement below, for the attachment of the lower end of the cable and for the retention and guide of the actuating tackle rope; and Fig. XIX is a top view and shows a duplex cable system, on which the carrier tubes of duplex spider frames are mounted, and in which a duplex actuating tackle rope working round a surmounting pulley, alternately lowers and raises the respective members of the duplex spider frames, the said spider frames and their occupants acting as a counterpoise to each other.

Referring to the drawings:—1 represents a building to which my fire escape machine 2 is secured. 3 represents the cable that carries my escaping device. The said cable is preferably made of steel wire but may be of any other suitable metal or other material. A loop 4 at the upper end of said cable is secured by wire or other binding 5, and said loop is hitched onto the attachment hook 6, the eyelet lug 7 of which is secured by the screw nutted bolt 8 to its perforate seat 9, in a projecting base flange 10 of the attachment bar 11, which bar is secured by the bolts 12 to the window jambs 13 of the upper course of windows 14 of said building 1. The said bar is preferably of steel but may be of other suitable material.

15 represents a hanger-rod, that is seated within the bracket 16, which bracket is secured to said attachment bar 11 by the bolts 17, and the screw threaded upper end 18 of said hanger-rod is there secured by the screw nut 19 seated thereon.

20 is a bifurcated pulley holder, the perforate attachment lug 21 of which fits and works within the perforate bifurcated pendent lugs 22 at the foot of said hanger rod 15, to which it is pivotally secured by the journal bolt 23. The pulley 24 runs on its pivot journal bolt 25 within the perforate lugs 26 of said bifurcate pulley holder. 27 is the actuating tackle rope that is rove around said pulley, which pulley constitutes its upper running attachment. The action of said rope will be hereinafter described.

28 represents a ring bolt, the shank point 29 of which is inserted in the side pavement 30 or in the bed 31 of the street as may be preferred, opposite to the upper attachment hook 6 that secures the top of the cable to the building. The major attachment ring 32 works freely in the eyelet 33 of said ring bolt, so as to drop down on the surface of the pavement when not in use, so as not to interfere either with foot passengers when passing on the side-walk or with teams on the street, in either of its said positions.

34 represents the foot hook of the cable, the eyelet shank 35 of which is secured by the loop 36 at the lower end of said cable to the same, and when the fire escape is in operation, said hook 34 is secured to said ring 32, the cable 3 being held taut between said attachment hooks 6 and 34.

37 represents an integral minor attachment ring that projects from the periphery of said major ring 32, through which minor ring the lower end of the actuating tackle rope is rove.

38 represents my spider frame on and in connection with which are means provided for the escape of parties from a burning building, to which my machine and tackle have been secured. 39 represents a (preferably metal) carrier tube, that is provided with a brake friction anti-wear lining 40, which lining is preferably of strong pickled raw-hide, which is pre-eminently well adapted when being forced against the cable it rides to exert a friction brake pressure thereon and at the same time not readily succumb from the wear and tear thereon. The upper end of said carrier tube has an upward curve 41, that measurably accommodates itself to the upward curve of the cable when weighted down by its load.

42 represents the pendent frame that hangs from said carrier tube, which frame is constituted of various metal strap bars bolted or riveted together. 43 is the main saddle hanger bar of said frame, the attachment loop 44 of which clamps around said carrier tube at near the foot of its upward curve 41, and 45 is the saddle supporting foot curve of said hanger bar, to which foot curve is secured, the preferably wooden saddle seat 46 by the bolts 47.

48 represents the angle brace bar of the frame, the loop 49 at the forward end of which has a firm clutch hold of said carrier tube, near its forward end, and the perforate rear end of said brace bar is secured to the main saddle hanger bar 43, in near proximity above its saddle 46, by the bolt or rivet 50. The loop 49 may be secured to the carrier tube by the rivet 51. A set screw 52, also secures the loop 44 of the main saddle hanger bar 43 to the carrier tube.

53 represents the middle junction bar of the spider frame, the perforate rear end of which is secured to the saddle hanger bar by the rivet 54 and its perforate curve elbow forward end 55 is secured to the angle bar 48 by the rivet 56. The said junction bar 53, has an upward projection 57 above its elbow 55, which projection is surmounted with the guide loop head 58.

59 is a surmounting bar, the perforate foot flange 60 of which is seated on said carrier tube above said saddle hanger bar, and is there secured by the rivet 61, and 62 is a vertical loop head at the top of said bar 59, in which loop head the upper lay or section of the actuating tackle rope has its first rest and guide seat in nearest proximity to the pulley 24 around which it runs.

63 represents a hanger bar that surmounts, and its saddle loop 64, clutches said carrier tube 39 a short distance ahead of the loop 44 of said saddle hanger bar, and said saddle loop is secured from longitudinal displacement by set screw 65 that passes through said loop 64 and into said carrier tube 39.

66 represents an eccentric lever, the eccentric head 67 of which works between the duplicate pendent bars 68 of said hanger 63. The said eccentric lever has its pivot bearings on the screw journal bolt 69, which passes through its perforate bearing 70 in said bars 68 of said hanger 63, and through the eccentric head 67, and both form a journal for said eccentric to work on by the influence of said lever, and hold the duplicate bars 68 of said hanger in co-adjutant connection when its screw-nut 71 is attached thereon.

72 represents a slot in the under side of said carrier tube, about four inches in length more or less, above said eccentric lever, and 73 is an internal countersink boxing that is prolonged for about half an inch more or less rearward from said slot within said tube, the said countersink boxing being sunk about half way through said tube. 74 is a friction brake block that rests on said eccentric, its upper edge being seated within said slot 72, and said brake block has a projecting extension 75 rearward of its upper edge, of a coincident length with said countersink boxing in which it rests when said brake-block is at rest, and holds the elongated end of said block from dropping out of said slot when not clamped by the eccentric.

76 represents a projecting steel spring bar the perforate foot 77 of which is secured to the angle bar 48 of the spider frame by the rivet 78. A turned loop 79 at the head of said spring bar loosely incloses the actuating tackle rope after its passage through the guide loop 58 of the bar 57 on its way to the eccentric lever 66. The final end 80 of said actuating rope is secured by its snap attachment 81 to the staple ring 82 that projects from the eccentric lever.

83 represents out-turned angle flanges at the feet of the hanger bar 63, and 84 are perforations in said foot flanges in which the loops 85 of the pendent supporter escape ropes 86 are secured. There are preferably two of said perforate foot flanges to said hanger bar, so as to supply means of attachment for two of said pendent supporter escape ropes, but the apparatus may be constructed with only one of said pendent escape devices, where more extensive facilities are not required.

87 represents the individual sections of said pendent escape ropes, which sections are of about the length of the height of the individual stories of the building to which my fire escape machine is attached. The said sections of the rope are secured together by the junction links 88, through which are slipped the holder straps 89, or said straps may be secured to said links by the snap connections 90. The said straps are passed around the body of the person being rescued preferably just below the arms, and are there secured by the buckle 91. A succession of said rope section links and holder straps, as many as are required in accordance with the number of stories from which it is desired to provide said supplemental means of escape, are provided and hang pendent from said perforate snap attachments of the upper section to said angle flange or respective angle flanges 83.

92 represents the depository reel-chest that is preferably seated on the pavement 30 close to the base wall of the building 1. In said reel-chest is housed the cable reel 93, on which is normally coiled when not in use the cable 3 that carries the fire escape spider frame 38, except the upper pendent end of said cable, which reaches direct from its reel in said reel box to the aforesaid attachment hook 6, on which the upper loop 4 of the cable is secured. The said hook, as has been stated, being secured to the projecting flange 10 of the attachment bar 11, which bar is secured to the side jambs 13 of one of the upper story windows of the building to which the fire escape is attached, and which attachment to said window jambs securely holds the upper attachment of said escape devices.

95 represents the slot-way through the tight top 96 of the reel chest, through which slot-way the cable passes "*en route*" to the reel, when stored in abeyance awaiting its possible use. The said cable after passing through said slot is coiled around and around the drum 97 of said reel 93, within the arms 98 thereof.

99 represents the front door of said reel-chest which door is secured to the bottom 100 of said chest by the hinges 101, and when said door is turned on said hinges, and shut against the ends 102 thereof, the spring snap-catch 103 that is secured to said door by screws 104, engages in the lock socket 105 and holds said door shut. When at the time of a fire, or at any other time, it is required to abstract the reel, then by pressing on the actuating knob 106 that governs the snap-catch 103, the bolt stem of said catch presses back on its spiral spring 107 and the catch bolt is thus withdrawn from its lock-socket 105, so as to free the door to be opened. The bottom or base-board 100 of said reel chest, is with said chest securely held in position by the turn hooks 108, the pivot stem 109 of which is seated in socket bed 110 in the pavement and turns with hook head to engage said base and hold said reel-chest firmly to its place. 111 is a midway partition in said chest that divides the cable reel chamber 112 from the tackle reel chamber 113, that houses the tackle reel 114. 115 is the hand hole in the upper side of said partition, that facilitates access to said tackle reel chamber, when the surmounting lid 116 of said chamber is elevated on its hinge 117. 118 is an angular metal hasp strap, the perforate top end of which is secured to said lid by the screws 119, and its perforate lower end is secured to the end of the chest when said lid is closed, by the loop handle key pin 120, which passes through said perforate strap and is seated in the key hole 121. The back 122 of said chest is permanently secured to the ends thereof, as the sole opening to the tackle reel chamber for the insertion and withdrawal of the tackle reel is *via* the top which is opened up by the elevation of said lid 116. The said tackle reel 114 is constituted of the drum 123, and the peripherally projecting side-disks 124, around which drum and between which side-disks the actuating tackle rope 27 is wound, with the exception of the permanently attached end thereof that when not in use reaches from said depository reel chest to the surmounting pulley 24, at the head attachment quarters of the tackle. When the surmounting lid 116 is closed said tackle rope passes from said reel 114 through the slot 126 in the end of said lid.

127 represents perforate lugs, that are seated in the countersinks 128 in the rear of the end pieces of the reel chest, where said lugs are secured by screws 129 that pass through their perforations, and into said ends, and the lugs project inward, so as to effect a stay hold midway up on each side of the rear of the reel, so as (in combination with the midway partition 111), to hold said reel in position. 130 represents rubber or other anti-friction stay disks that are secured to the inside of the ends of said chest, immediately adjacent to said lugs 127, and said disks hold against and spring cushion said reel in the chest.

131 represents a steel spring, the perforate fast end of which is secured by the screw 132 to the under side of the lid 116, and 133 is a rubber spring cushion that is secured to the bulge projecting side of said steel spring, and cushions against the upper edges of said reel.

134 represents the pendent angle turn spindle that is secured by its screw nutted attachment 135 to its perforate seat 136 in the projecting base flange 10 of the attachment bar 11. The said spindle holds the overplus of the secondary moiety of the cable and actuating tackle rope when the double counterpoise system is used as shown in Fig. XIX.

137 represents an arc coping or overshed, the perforate attachment edge 138 of which is secured to the said attachment bar 11, from which the fire-escape tackle hangs by the screw nutted bolt 139, which bolt passes through and is seated in said flange.

At the time of a fire, the reel 93, around which the cable 3 is wound is taken from said reel-chest and the cable is run out until its attachment foot hook 34 is made to engage in the attachment ring 32, that is secured in the eyelet 33 of the ring bolt 28, the said bolt being seated, it may be in the pavement on the opposite side of the street, as shown in Fig. XII, or in any other suitable position; the upper end of said cable being as previously stated, permanently attached by its loop 4 to its hook 6 on said flange 10 of said bar 11. As aforesaid, the metal carrier tube 39 of the spider fire escape frame 38, runs on said cable 3, under the movement of the actuating rope 27, the snap attachment 81 of which rope is secured to the staple ring 82 at near the upper end of the eccentric lever 66, and said rope passes through the down turn loop 79 at the terminal of the steel spring bar 76, then said rope passes through the guide loop 58 of the bar 57, from which it passes to and through the integral minor attachment ring 37 that projects from the major ring 32 that carries the foot hook of the cable from which point it is passed back and through the loop-head 62 of the bar 59 that surmounts the main saddle hanger bar 43, from which said rope passes to and around the pulley 24 and back to the operative eccentric lever 66, through the perforation 140 in the drive end of said eccentric lever, the said actuating rope is finally secured by the loop tie attachment 141. Now it will be seen that when the operator or the person escaping from the fire is seated on the saddle 46 and he holds the operating eccentric lever in the position shown in Fig. XII and in full lines in Fig. I, then the eccentrically operated brake block 74 is forced upward against the raw-hide lining, within the tube 39 against the cable 3, and that it can thus regulate the amount of friction it exercises on the same and the consequent respective speed or slowness of the descent and the complete stoppage thereof as may be required. It will also be seen that the whole course of said rope tackle throughout its circuit, follows suit by the action of said lever. It will also be seen that if a weak, sick or incapacitated person is occupying the saddle of said spider escape frame, and either lacks nerve or strength or knowledge to operate the lever, then others either on the street, at the lower end of the tackle, or in the building, at its upper end, can work the rope to either draw the lever into its brake position or to the loosening or withdrawal of said brake. It will also be seen that when the eccentric lever is elevated and lodged on top of the spring bar 76, as shown in broken lines in Fig. I, (where it remains until dislodged therefrom,) then the eccentric is entirely withdrawn from the brake-block 74, which itself retires from the cable, and the spider escape frame can be again elevated by parties at either end working hand over hand on the tackle rope, the said spider frame being unloaded and the brake entirely released. Also when said spider escape frame is preparing to descend from, it may be one of the upper stories, at the same time the pendent link section escape ropes 87, with their holder straps 89 offer facilities by means heretofore described for the escape of persons from any of the intermediate stories between said spider frame and the street.

I do not confine myself to the single cable and single spider frame escape system for it is evident that the same invention may be and it is intended to be amplified as shown in Fig. XIX, in which a double cable is used with two balancing spider escape frames, that has especial advantages in aiding the escape of the sufferers, and at the same time gives facility for the ascent of firemen to aid the escape of those who need help and to fight the fire.

It will be seen that this duplex balance system is substantially the same device, which provides two ends of the cable, instead of only one, to hang pendent from the loop 4, and their lower ends secured to two instead of only one ring hook; the tackle rope being lengthened so as to pass from the mutual pulley 24 to the perforate lug 142 of each spider frame, from which it may pass into the same operative connection with the ring bolt 28, and with the eccentric lever 66, as heretofore shown and described, or if preferred in any contingency the tackle can be simply connected to said perforate lugs. In either case the two loaded fire escape spider frames, one conveying the ascending firemen, and the other the escaping occupants of the building balance each other and by said duplex arrangement, facilitate the transfer back and forth. It will also be seen that when the eccentric lever 66 is elevated and seated on the spring bar 76, so as to allow the dropping of the friction brake block 74 out of action, then if the spider frame is to be lowered by the draw on the tackle rope either from the ground or building, or other position, the action of the tackle on said spring bar immediately springs the bar and precipitates the eccentric lever that is mounted thereon, so as to make the eccentric brake operative and to lower the handle of the lever within reach, if there should be an occupant of the saddle.

The cable is preferably of wire, but may be of any other suitable material. I have shown said cable in Figs. I, XII, XIII, and XVII in an inclined, operative position, which in most instances will be its preferred position; but I do not confine myself to said inclined position, for it is evident that said cable will effect its intended functions also when placed in a vertical position, and that in some cases as when used in narrow alleys, or in open center courts to high buildings, said cable may have to be hung in very nearly a vertical position, and can be hung, or if need be, in especial urgent cases it may even be hung pendent in a vertical position without even taking time to fasten at bottom. In connection with said adaptation of my cable, to its varied inclined and vertical positions, it will be seen that I have combined another novel construction by means of the saddle hanger bar 43, that carries the saddle 46 and occupant thereof, as also the angle-brace bar 48 of the spider-frame to overcome the adverse effect of the increased gravity in the descending spider frame when it descends in a vertical, instead of an inclined direction; for the steeper the incline of said cable, even up to that of a vertical or plumb cable, the greater will be the brake leverage exerted by the weight of the occupant of the saddle via said saddle hanger bar 43, on the carrier tube 39 and on its raw-hide friction lining 40, as also of the projecting brace bar 48 of said spider escape frame.

It is evident that the nearer the cable attains to a plumb or vertical position, the farther removed from said plumb will be the dominant end of said hanger bar 43 and brace frame 48 from said plumb, and consequently greater will be the leverage they exert via said raw-hide lined combined tube carrier and friction brake on said cable. In other words, by the above described novel construction, any increased ratio of inclination of the carrier cable causing an increased ratio of gravity of the spider escape frame and the occupant of its saddle, is offset by the consequent equivalent increased ratio of brake power exercised by the increased leverage of said hanger bar 43 and angle brace 48. Also the said construction has and exerts a compensating influence, as above described, by means of which a heavy occupant of the saddle of said escape frame effects a corresponding power on the friction brake.

I claim as my invention—

1. In a fire escape, the combination of the cable 3, the tube 39 having the upward inclined head curve 41 and the hide lining 40 of said tube adapted to ride on said cable the projecting attachment hook 6 from which said cable is suspended, the attachment hanger bar 11 provided with projecting base 10, to which said hook is attached, the spider escape frame 38 pendently inclined from said tube, the said frame having the saddle hanger bar 43, and the saddle seat 46 secured to said bar; substantially as described.

2. In a fire escape, the combination of the cable 3, the tube 39 and the friction lining 40 of said tube adapted to ride on said cable, the spider escape frame 38 pendent from said tube, the said frame having the hanger bar 43, the saddle seat 46 secured to said hanger bar, the hanger bar 63, the eccentric lever 66 having the eccentric head 67, pivoted to said hanger bar, and the friction brake block 74; substantially as described.

3. In a fire escape, the combination of the cable 3, the tube 39, and the friction lining 40 adapted to ride on said cable, the spider escape frame 38 pendent from said tube, the said frame having the hanger bar 43 with the foot curve holder 45, the saddle seat 46 mounted on said holder, the hanger bar 63, having the out-turned, perforate angle flanges 83, the pendent supporter escape ropes 86 constituted of the individual sections 87, the junction links 88, that connect said sections, the holder strap 89, the snap connection 90, and the attachment buckle 91; substantially as described.

4. In a fire escape, the combination of the window jambs 13, the attachment bar 11 secured to said jambs and having the projecting base flange 10, the attachment hook 6 secured to said bar, the cable 3 secured to said hook, the tube 39 and the friction lining 40 adapted to ride on said cable, the spider escape frame 38, pendent from said tube, the said frame having the hanger bar 43, the saddle seat 46 secured to said hanger bar, the hanger bar 63, the eccentric lever 66, with its eccentric perforate head 67 pivoted to said hanger bar, and the friction brake block 74 seated and worked in the slot 72 in said tube 39; substantially as described.

5. In a fire escape, the combination of the cable 3, the attachment hook 6, secured to a building on which hook said cable is wound, the ring bolt 28 secured in the street, the attachment ring 32 mounted in the eyelet head 33 of said bolt, in which ring the foot of said cable is secured, the tube 39 adapted to ride on said cable, the spider escape frame 38 pendent from said tube, said frame having the hanger bar 43, the saddle seat 46 mounted on said bar, the hanger bar 63, and the eccentric lever 66 with its eccentric head 67, pivotally connected to said bar; substantially as described.

6. In a fire escape, the combination of the cable 3, with its means of attachment to a building above and street below, the tube 39 and the friction lining 40 of said tube, adapted to ride on said cable, the spider escape frame 38 pendent from tube, the said frame having the hanger bar 43, the saddle seat 46 secured to said hanger bar, and the actuating tackle rope 27 adjustably secured to and having running connection with said building, street and spider frame, and the eccentric lever 66 that consecutively works said tackle rope and is worked by it; substantially as described.

7. In a fire escape, the combination of the window jambs 13, the attachment bar 11 with its base flange 10 secured to said jambs, the cable attachment hook 6 secured to said base flange, the bracket 16, hanger rod 15, the bifurcated pulley holder 20 and the pulley 24 mounted on said bar 11, the ring bolt 28 secured in the street or side-walk pavement, the attachment ring 32 with the minor attachment ring 37, said rings mounted in the eyelet head 33 of said ring bolt 28, the cable 3, mounted on said hook 6 above and to said ring 32 below, the tube 39 and its friction lining 40 mounted on said cable, and adapted to ride thereon, the spider fire escape frame 38 that hangs pendent from said tube, the said frame having the main saddle hanger bar 43, the angle brace bar 48, the middle junction bar 53, the surmounting extension bar 59 with its vertical loop head 62, the upwardly projecting bar 57 having the guide loop head 58, and the projecting spring bar 76, having the loop head 79, the double strap hanger bar 63, the eccentric lever 66, pivoted to said hanger bar, the friction block 74 and the actuating tackle rope 27, mounted on and connected with said pulley 24, eccentric lever 66 and guide loop heads 79, 58 and 62; substantially as described.

8. In a fire escape, the combination of the cable, 3, secured to the building above and to the street or ground below, the tube 39 adapted to ride on said cable, the fire escape frame 38 pendent from said tube, the eccentric lever 66, the friction block 74, the actuating tackle 27, the depository reel chest 92, the cable reel 93, and the tackle reel 114; substantially as described.

9. In a fire escape, the combination of the cable 3, secured to the building above and to the street or ground below, the tube 39 adapted to ride on said cable, the fire escape frame 38 pendent from said tube, the eccentric lever 66, the brake block 74, the actuating tackle 27 with running connection with the building above, with the street or ground below, and with said fire escape frame, the depository reel chest 92, having the front door 99, with hinges 101 and spring snap catch 103, the surmounting lid 116, with hinge 117, hasp strap 118 and key pin 120, the midway partition 111, provided with the hand hole 115, the cable reel 93, the tackle cable 114, the stay lugs 127, the anti-friction stay disks 130, the pendent spring 131 with its rubber cushion 133, and the duplex turn hooks 108, and the coping 137; substantially as described.

10. In a fire escape, the combination of the cable 3, the metallic tube 39, with the upward inclined head curve 41 with its hide lining 40, adapted to slide on an inclined cable, the spider escape frame 38 that hangs pendently inclined from said tube, said frame when loaded constituting a self-acting brake on the cable the said frame adapted to carry persons escaping from a fire, the staple ring 82, the actuating tackle-cord 27, the pulley 24, the reel-drum on which said cable and tackle cord are reeled and the eccentric lever 66 and brake block 74, adapted to regulate the speed of the descent on the cable; substantially as described.

MERCILEUS PLINY BROWN.

In presence of—
NEWTON J. THOMPSON,
J. A. NISBETT.